US010104199B2

(12) United States Patent
Dent et al.

(10) Patent No.: US 10,104,199 B2
(45) Date of Patent: Oct. 16, 2018

(54) THREE-WAY COMMUNICATION LINK FOR INFORMATION RETRIEVAL AND NOTIFICATION

(71) Applicant: BANK OF AMERICA CORPORATION, Charlotte, NC (US)

(72) Inventors: Nathan Dent, Concord, NC (US); Caitlin Chrisman Bullock, Durham, NC (US); Matthew Eugene Clark, Milpitas, CA (US); Nitu Nanda, Union City, CA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 274 days.

(21) Appl. No.: 15/166,956

(22) Filed: May 27, 2016

(65) Prior Publication Data
US 2017/0344208 A1    Nov. 30, 2017

(51) Int. Cl.
G06F 3/048      (2013.01)
H04L 29/08      (2006.01)
G09G 5/377      (2006.01)
G06F 3/14       (2006.01)
G06F 17/30      (2006.01)
H04W 4/021      (2018.01)

(52) U.S. Cl.
CPC ........... H04L 67/32 (2013.01); G06F 3/14 (2013.01); G06F 17/30 (2013.01); G09G 5/377 (2013.01); H04W 4/021 (2013.01); G09G 2340/12 (2013.01); G09G 2354/00 (2013.01); G09G 2358/00 (2013.01); G09G 2370/042 (2013.01)

(58) Field of Classification Search
None
See application file for complete search history.

(56) References Cited

U.S. PATENT DOCUMENTS

| 6,311,159 | B1 | 10/2001 | Van Tichelen et al. |
|---|---|---|---|
| 6,757,362 | B1 | 6/2004 | Cooper et al. |
| 6,965,868 | B1 | 11/2005 | Bednarek |
| 7,415,100 | B2 | 8/2008 | Cooper et al. |
| 7,546,254 | B2 | 6/2009 | Bednarek |
| 7,920,678 | B2 | 4/2011 | Cooper et al. |
| 8,731,942 | B2 | 5/2014 | Cheyer et al. |
| 8,955,076 | B1 | 2/2015 | Faibish et al. |
| 9,609,544 | B2 | 3/2017 | Raleigh et al. |
| 9,692,742 | B1 | 6/2017 | VanLund et al. |
| 2007/0138268 | A1* | 6/2007 | Tuchman .............. G06Q 30/02 235/383 |
| 2009/0234700 | A1 | 9/2009 | Galvin et al. |

(Continued)

Primary Examiner — Claudia Dragoescu
(74) Attorney, Agent, or Firm — Michael A. Springs; Moore & Van Allen PLLC; Nicholas C. Russell

(57) ABSTRACT

Embodiments of the invention are directed to a system, method, or computer program product for creating a communicable linkage for information retrieval and notifications between devices. In this way, the invention identifies a mobile device at an entity location. The system may integrate into the mobile device and present an interactive display onto the display of the mobile device, allowing the user to select products/services associated with the entity. Based on the general interaction and selection a user makes via the mobile device, the system identifies the interaction and presents interaction data to the entity representative at the entity location for assisting the user.

20 Claims, 5 Drawing Sheets

(56) References Cited

U.S. PATENT DOCUMENTS

| | | | |
|---|---|---|---|
| 2010/0332989 A1* | 12/2010 | Havivi | G06F 3/0481 715/733 |
| 2012/0016678 A1 | 1/2012 | Gruber et al. | |
| 2012/0136997 A1 | 5/2012 | Yan et al. | |
| 2012/0233314 A1 | 9/2012 | Jakobsson | |
| 2012/0265874 A1 | 10/2012 | Hoh et al. | |
| 2013/0031476 A1 | 1/2013 | Coin et al. | |
| 2013/0104197 A1 | 4/2013 | Nandakumar | |
| 2013/0152092 A1 | 6/2013 | Yadgar | |
| 2013/0282438 A1 | 10/2013 | Hunter et al. | |
| 2014/0058825 A1* | 2/2014 | Raman | G06Q 30/02 705/14.42 |
| 2014/0109085 A1 | 4/2014 | Carrara et al. | |
| 2014/0222436 A1 | 8/2014 | Binder et al. | |
| 2014/0229208 A1 | 8/2014 | Tamayo | |
| 2014/0229405 A1 | 8/2014 | Govrin et al. | |
| 2014/0230036 A1 | 8/2014 | Nandakumar | |
| 2015/0237493 A1* | 8/2015 | Won | G06F 3/04817 715/734 |
| 2015/0294322 A1 | 10/2015 | Grigg et al. | |
| 2016/0012375 A1 | 1/2016 | Hanson et al. | |
| 2016/0012409 A1 | 1/2016 | Hanson et al. | |
| 2016/0012412 A1 | 1/2016 | Scanlon et al. | |
| 2016/0012484 A1* | 1/2016 | Hanson | G06Q 30/0261 705/14.58 |
| 2016/0012496 A1 | 1/2016 | Hanson et al. | |
| 2016/0012505 A1 | 1/2016 | Hanson et al. | |
| 2016/0014552 A1 | 1/2016 | Hanson et al. | |
| 2016/0112397 A1 | 4/2016 | Mankovskii | |
| 2016/0293134 A1 | 10/2016 | Fortin | |
| 2017/0324633 A1 | 11/2017 | Lehner et al. | |
| 2017/0346757 A1 | 11/2017 | Achtner et al. | |

* cited by examiner

THREE-WAY COMMUNICATION LINK FOR INFORMATION RETRIEVAL AND NOTIFICATION

BACKGROUND

Users typically have a variety of options when communicating with entities. A user may have one or more ways he/she prefers to communicate with the entity, such as communicating over the telephone, online, mobile, or at a brink-and-mortar location. With advancement in technology, more and more individuals possess communication devices allowing for telephonic, online, or mobile communications anywhere. These devices require compatibility for communication, however in some cases compatibility with entity systems and secure systems may cause delays in product or service presentation to the user.

BRIEF SUMMARY

Embodiments of the present invention address the above needs and/or achieve other advantages by providing apparatuses (e.g., a system, computer program product and/or other devices) and methods for creating a communication link between an electronic display at a financial center with a user's mobile device and representative station. In this way, the invention displays various financial information and statistics, such as an example user. Furthermore, the display may be interactive, allowing a user to select or scan links. The system may then communicate information associated with the selected or scanned links to the user's device and allows the user to gather information, subscribe, get notifications, or receive services. Furthermore, the selected or scanned links can then be communicated via the three-way communication link to a representative device in order for the representative to aid the user in selection of a product or service.

As such, in some embodiments, the invention comprises a distributed network with one or more data feeds for three-way communication linkage generation for data transformation and notification distribution. In this way, the invention allows for otherwise incompatible devices, such as a user mobile device, to communication with entity representative systems. Furthermore, the invention may integrate into the user's mobile device and display an overlay screen with interactive elements that mimic an electronic display presented at the entity brick-and-mortar location.

Embodiments of the invention relate to systems, methods, and computer program products for three-way communication linkage generation, the invention comprising identifying a user entering an entity location, wherein identifying the user entering the entity location comprises identifying a user system associated with the user within the entity location and identifying compatibility protocol for the user system for communication compatibilities; extracting navigation data from an electronic display system, wherein the electronic display system includes an interactive display located at and associated with the entity, wherein navigation data comprises entity information the user navigates to on the electronic display system while at the entity location; identifying, via communication link with the electronic display system, a display configuration for entity information to be displayed on the user system, wherein the display configuration includes entity information, including products and services provided by the entity, based on the navigation data the user navigated to on the electronic display system, wherein the display configuration comprises a navigatable user interface; generating the three-way communication linkage via a distributed network between the user system, the electronic display system, and a representative system associated with a representative at the entity location; converting the display configuration for entity information received from the electronic display system into the compatibility protocol for the user system; presenting, via an overlay on the user system, the converted display configuration with entity information of user interest; identifying, based on tracking, the user navigation of the entity information presented via the overlay of the converted display configuration; and communicating, via a secure communication channel, the user navigation of the entity information from the electronic display system and the user navigation of the entity information from the user system overlay to the representative system for representative communication with the user at the entity location.

In some embodiments, the invention further comprises identifying the user interacting and navigating the electronic display system, wherein identifying the user interacting and navigating the electronic display system comprises identifying the user system interacting with the electronic display system via scanning.

In some embodiments, the invention further comprises receiving representative input based on the representative communication with the user at the entity location and generating an altered user display with additional entity information based on the representative input.

In some embodiments, communicating the user navigation of the entity information from the user system overlay further comprises accessing the user system and identifying selections and navigations of the user one the user system and translating the user interactions of the entity information into an entity compatible format for presentation to the representative system.

In some embodiments, presenting the converted display configuration with entity information of user interest on a display associated with the user system comprises locking the functionality of the user system and altering the display of the user system with the converted display configuration with entity information, including products and services provided by the entity of user interest in the compatibility protocol for the user system.

In some embodiments, identifying the user entering the entity location comprises identifying a scanning or selecting of the electronic display system associated with the entity by the user device, wherein the scanning of the electronic display provides an identification of the compatibility protocol for the user system for communication compatibilities. In some embodiments, identifying the user entering the entity location comprises identifying the user system associated with the user using GPS recognition or internet protocol recognition of the user system within a pre-defined geo-location associated with the entity location.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
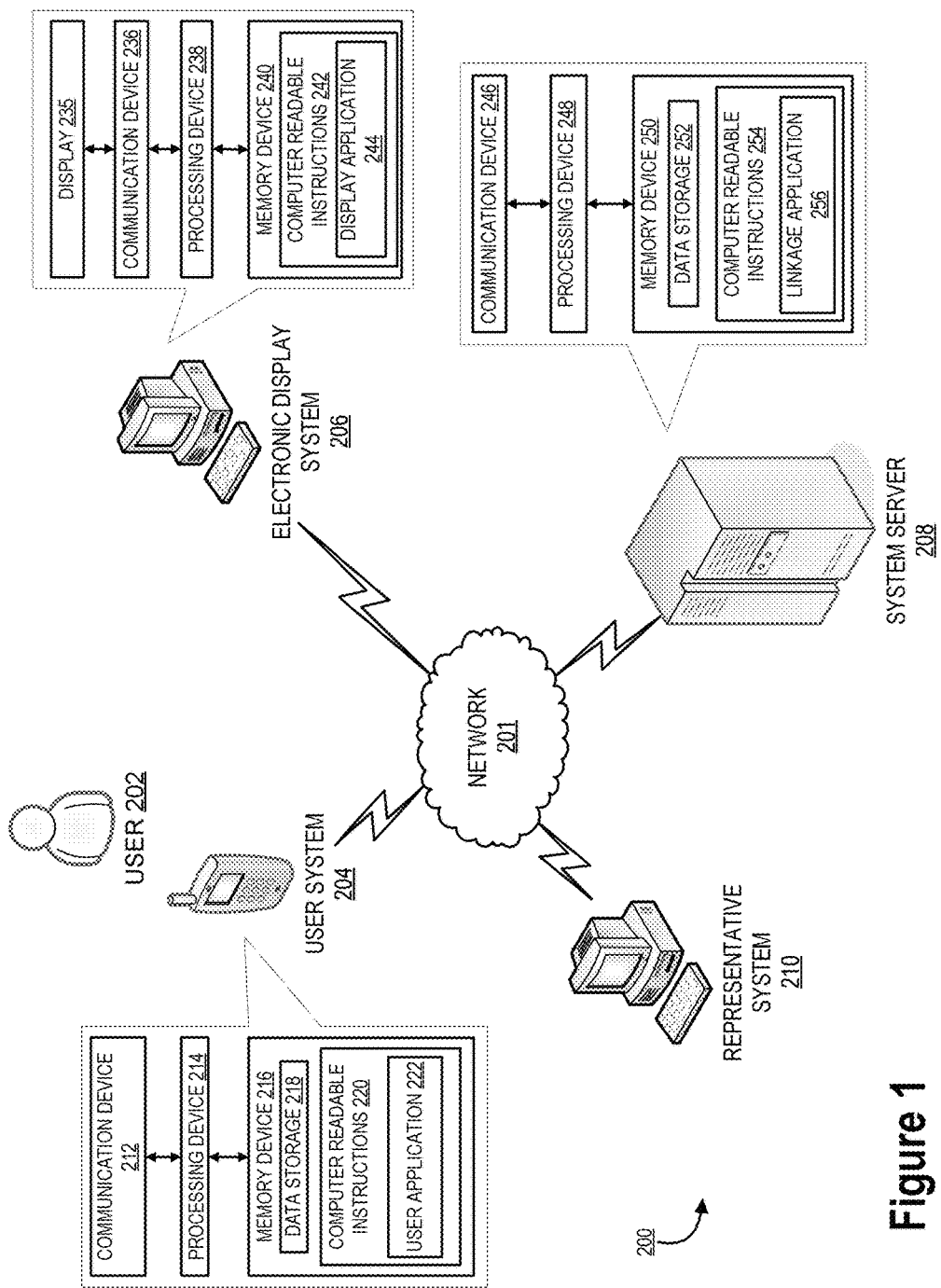
Figure 2:
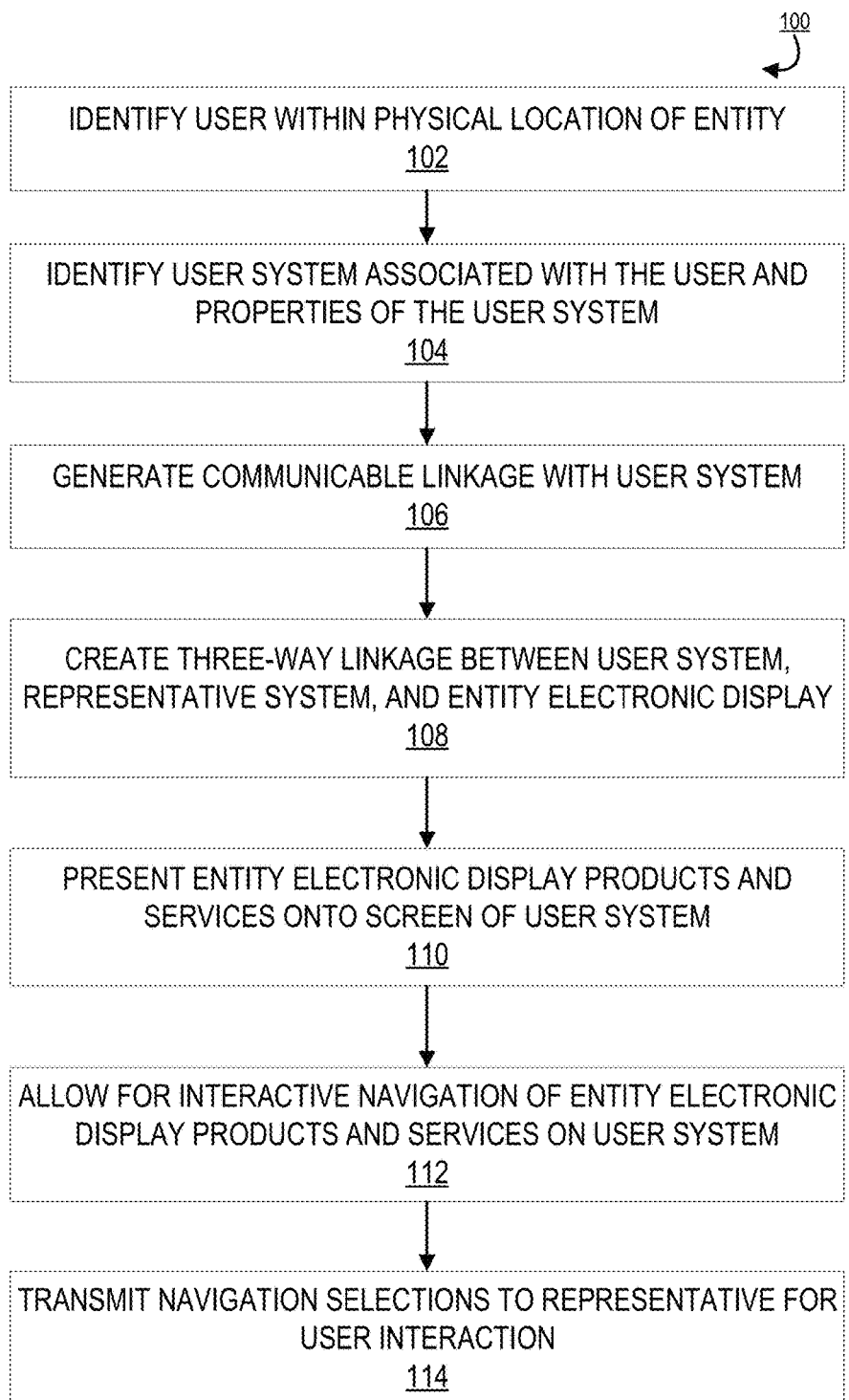
Figure 3:
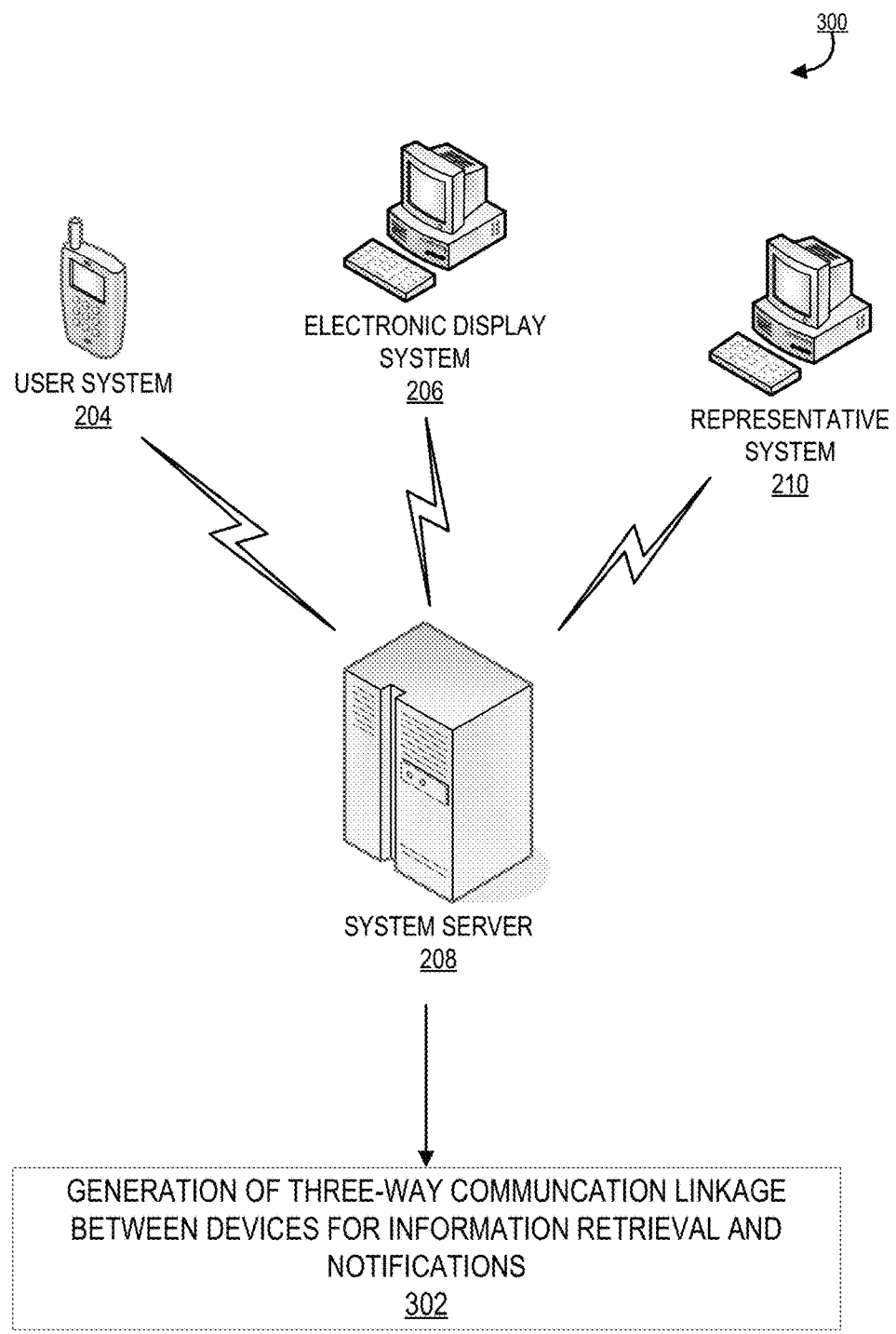
Figure 4:
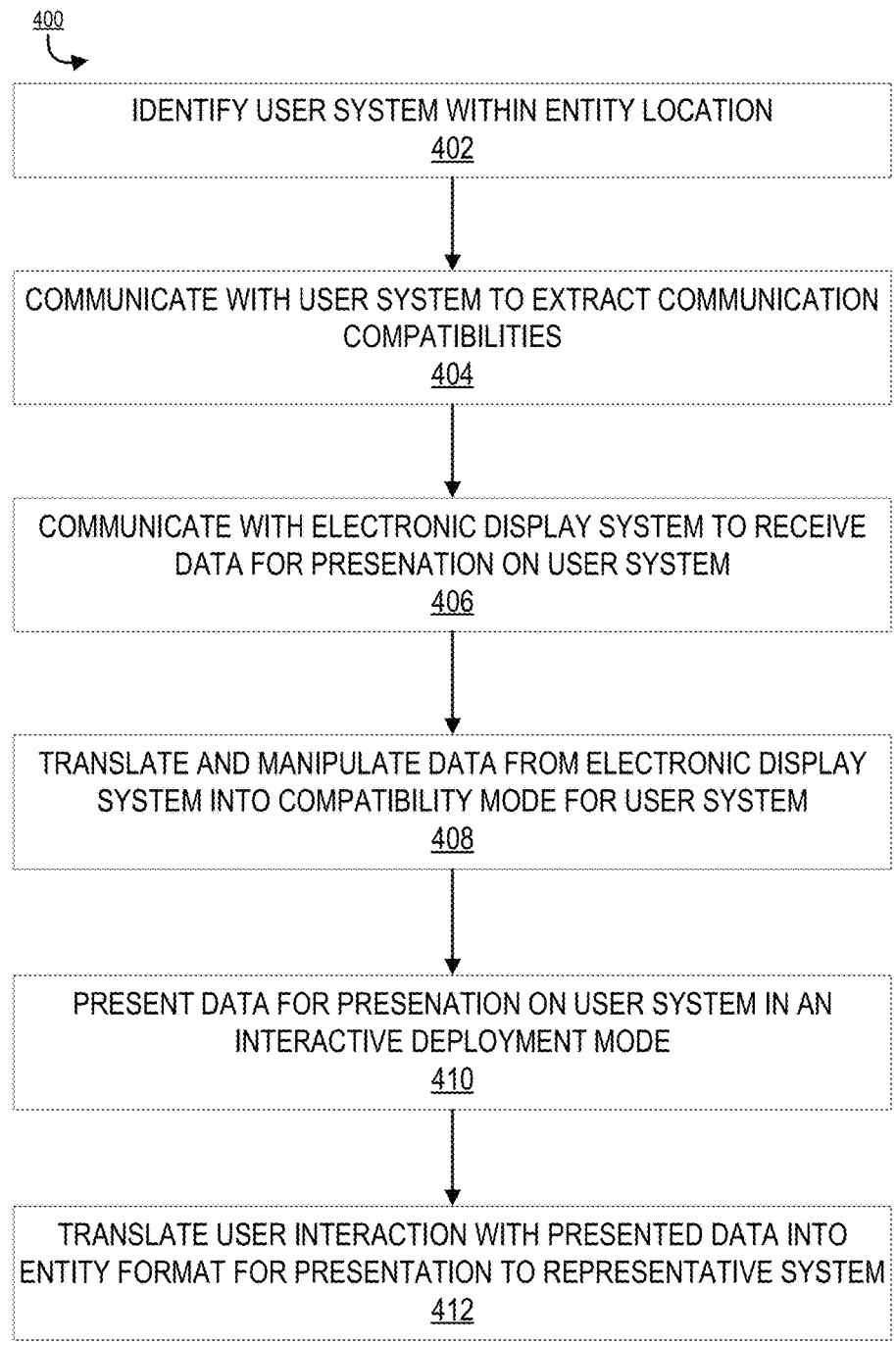
Figure 5:
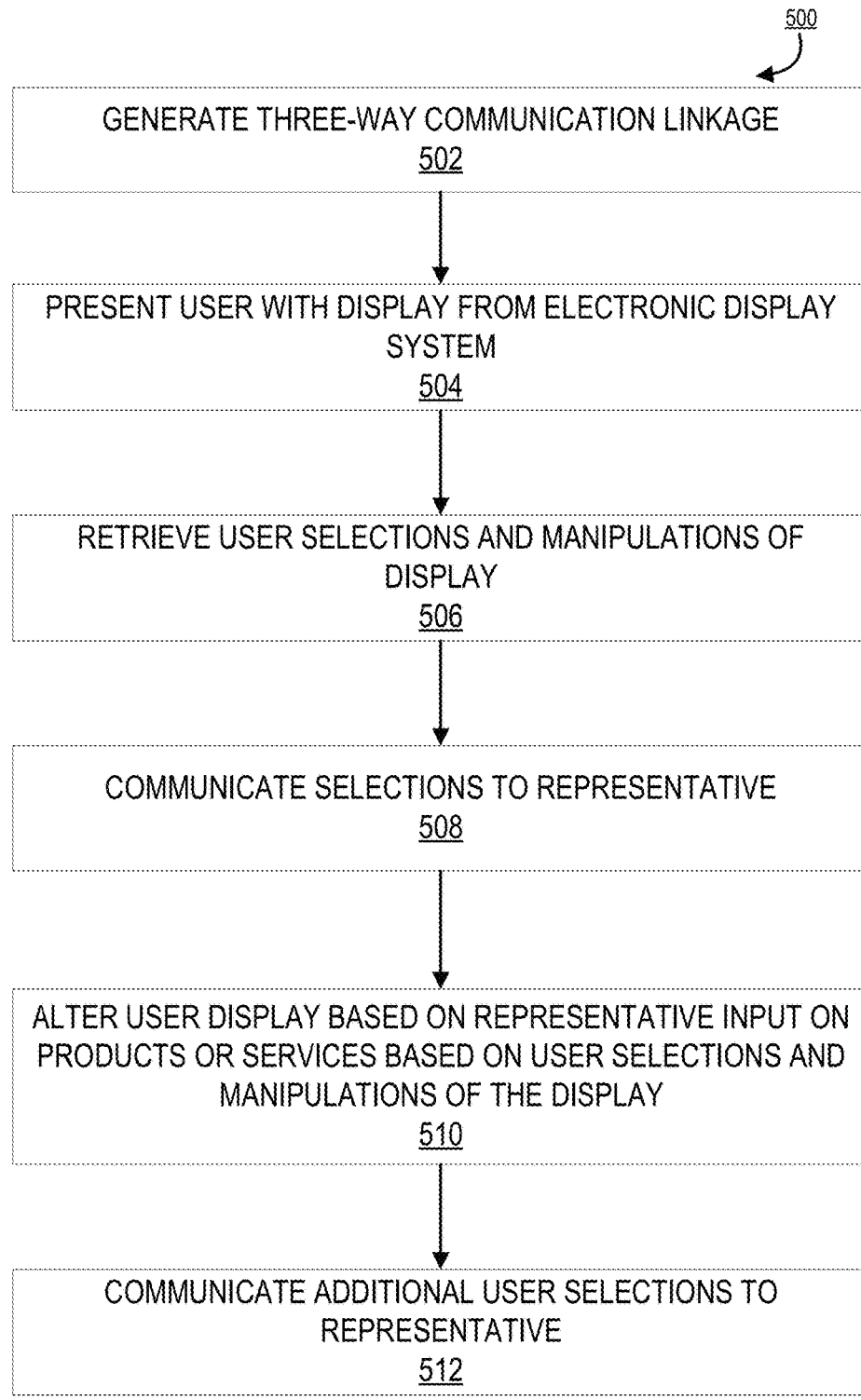

Having thus described embodiments of the invention in general terms, reference will now be made to the accompanying drawings, wherein:

FIG. 1 provides a three-way communication link system environment, in accordance with one embodiment of the present invention;

FIG. 2 provides a high level process flow illustrating initiation of the three-way communication linkage, in accordance with one embodiment of the present invention;

FIG. 3 provides a process map illustrating system communication for information retrieval and notification, in accordance with one embodiment of the present invention;

FIG. 4 provides a process map illustrating data transformation and compatibility conversion for information retrieval and notification, in accordance with one embodiment of the present invention; and FIG. 5 provides a process map illustrating information retrieval and notifications, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

The embodiments described herein may refer to the term representative. A representative may include one or more individuals associated with an entity that a user may communicate with. The representative may be a bank teller, a customer service representative, other employee, partner, or the like associated with the entity. Furthermore, a "channel" as used herein may be one or more ways in which a user may communicate with an entity, such as a financial institution. These channels may include one or more of online or offline channels. Online channels may include applications, clouds, websites, mobile applications, ATMs, or the like. Offline channels may include store locations, drive through locations, or the like.

The system creates a communication link between an electronic display at a financial center with a user's mobile device and representative station. In this way, the invention displays various financial information and statistics, such as an example user. Furthermore, the display may be interactive, allowing a user to select or scan links. The system may then communicate information associated with the selected or scanned links to the user's device and allows the user to gather information, subscribe, get notifications, or receive services. Furthermore, the selected or scanned links can then be communicated via the three-way communication link to a representative device in order for the representative to aid the user in selection of a product or service.

As such, in some embodiments, the invention comprises a distributed network with one or more data feeds for three-way communication linkage generation for data transformation and notification distribution. In this way, the invention allows for otherwise incompatible devices, such as a user mobile device, to communication with entity representative systems. Furthermore, the invention may integrate into the user's mobile device and display an overlay screen with interactive elements that mimic an electronic display presented at the entity brick-and-mortar location.

FIG. 1 provides a three-way communication link system environment 200, in accordance with one embodiment of the present invention. As illustrated in FIG. 1, the system server 208 is operatively coupled, via a network 201 to the user system 204, the representative system 210, and to the electronic display system 206. In this way, the system server 208 can send information to and receive information from the user system 204, representative system 210, and the electronic display system 206 to create a three-way communication linkage for information retrieval and notification presentation. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual communication with an entity. The communication may be via one or more channels associated with the entity, but typically via communication with the entity at a brick-and-mortar location of the entity. This brink-and-mortar location maybe a branch location for a financial institution. Channels may include one or more branch locations, online web sites, mobile applications, online applications, over the phone, at the merchant's place of business, ATM, or other mediums of communication with an entity. In some embodiments, the entity may be a financial institution or other institution providing services.

FIG. 1 also illustrates a user system 204. The user system 204 generally comprises a communication device 212, a processing device 214, and a memory device 216. The user system 204 is a computing system that allows a user 202 to communicate with the entity, such as the representative system 210, the system server 208, and the electronic display system 206, both via a network 201. The processing device 214 is operatively coupled to the communication device 212 and the memory device 216. The processing device 214 uses the communication device 212 to communicate with the network 201 and other devices on the network 201, such as, but not limited to the electronic display system 206 and the system server 208. As such, the communication device 212 generally comprises a modem, server, or other device for communicating with other devices on the network 201.

The user system 204 comprises computer-readable instructions 220 and data storage 218 stored in the memory device 216, which in one embodiment includes the computer-readable instructions 220 of a user application 222. In this way, a user 202 may utilize the user system 204 to receive overlay or integrated information and notifications via the display and transmit selections and/or manipulations of the presented data using the user application 222. The user system 204 may be, for example, a desktop personal computer, a mobile system, such as a cellular phone, smart phone, personal data assistant (PDA), laptop, or the like. Although only a single user system 204 is depicted in FIG. 1, the user context analysis communication aid system environment 200 may contain numerous user systems 204.

As further illustrated in FIG. 1, the system server 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the electronic display system 206, the representative system 210, and the user system 204. As such, the communication device 246 generally comprises a modem, server, or other device for communicating with other devices on the network 201.

As further illustrated in FIG. 1, the system server 208 comprises computer-readable instructions 254 stored in the memory device 250, which in one embodiment includes the computer-readable instructions 254 of an event processing application 256. In some embodiments, the memory device 250 includes data storage 252 for storing data related to the user context communication aid including but not limited to data created and/or used by the linkage application 256.

In the embodiment illustrated in FIG. 1 and described throughout much of this specification, the linkage application 256 may identify a user at the entity, generate a three-way linkage, present via overlay or integration of entity information to the user display, identify user navigation of display, and transmit navigation via notifications to representatives.

In some embodiments, the linkage application 256 may identify a user 202 when he/she enters a location associated with the entity, such as a financial institution. In some embodiments the linkage application 256 may identify a user 202 by user 202 authorization at the branch or ATM. In some embodiments, the linkage application 256 may identify the user 202 based on a representative or user 202 input, such as a check in or the like. In other embodiments, the linkage application 256 may identify the user 202 as being a pre-determined distance away from the branch location. This may be done via geo-fencing or geo-locating of the user 202 via the user system 204 being within the geo-fencing range. In other embodiments, the user 202 may interact with the electronic display system 206, which may alert the linkage application 256 of the interaction. In some embodiments, this interaction may be in the form of touching or manipulating the electronic display system 206 and a recognition by the electronic display system 206 of the user system 204. In some embodiments, this interaction may be a scanning or electronic interaction between the user system 204 and the electronic display system 206. The electronic display system 206 may be interactive. In some embodiments, the electronic display system 206 may be facing the user 202 at a branch or the like. In some embodiments, the electronic display system 206 may be connected to the user 202 via the user system 204. In other embodiments, the electronic display system 206 may allow for the scanning of code or the like to make advertisements, texts or other information relate to the user 202. In some embodiments, the electronic display system 206 may include a selection module for selecting for interaction with the user 202.

In some embodiments, the linkage application 256 may generate a three-way linkage between the user system 204, the electronic display system 206, and the representative system 210. In some embodiments, the linkage application 256 may generate the linkage by first identifying the user system 204 within a perimeter of the branch location of the entity. In some embodiments, the identification of the user system 204 may be based on a GPS recognition of the user system 204. In this way, the linkage application 256 may identify via GPS recognition that the user system 204 is located within the perimeter of the entity location. In other embodiments, the linkage application 256 may identify an IP address within the entity location network that is being registered or recognized within the entity network. In other embodiments, the linkage application 256 may identify the user system 204 within the entity location based on user 202 interaction with a representative and representative access, via the representative system 210, of user 202 information such as account information or the like. In this way, once the representative pulls up user 202 account information on his/her representative system 210, the linkage application 256 may trigger the identification of the user system 204 within the entity location. In some embodiments, the linkage application 256 may identify the user system 204 within the entity location based on user system 204 interaction with the electronic display system 206. In this way, the user 202 via the user system 204 may scan items, products, or services, from the electronic display system 206 onto his/her user system 204 for further review of and/or more information about the product or service.

In still other embodiments, the linkage application 256 may identify the user system 204 within the entity location based on user 202 interaction with the electronic display system 206. In this way, the linkage application 256 may identify a user 202 interacting via manipulation, browsing, or the like with the interactive features of the electronic display system 206.

In some embodiments, the linkage application 256 may present via overlay or integration of entity information to the user display. In this way, upon identification of a user 202 and user system 204 within the entity location, the linkage application 256 may identify products or services of the entity that the user 202 is interested in. The interest is determined based on user interaction with the electronic display system 206, user 202 discussions with a representative, and/or user 202 interaction with his/her user system 204.

Once products or services of the entity are identified, the linkage application 256 may present via a display associated with the user system 204 an interactive application that provides additional entity information. In some embodiments, the additional entity information may be presented via an overlay on the display of the user system 204. In some embodiments, the linkage application 256 may lock the user system 204 and present the user system 204 with the entity information during the time the user 202 is in the entity location.

In some embodiments, the linkage application 256 may identify user navigation of display and transmit navigation via notifications to representatives. In this way, upon presentation of entity information to the display of the user system 204, the linkage application 256 has access to the displaying material in order to identify the user's navigation throughout the entity information. In some embodiments, the linkage application 256 may identify a scanned or manipulated portion of the electronic display system 206. The navigation of the user device 204, scanned or manipulated electronic display system 206 provide an indication to the linkage application 256 what services or products provided by the entity that the user 202 is viewing. Once the information about what the user 202 is viewing is determined by the linkage application 256, the linkage application 256 may provide that information in a compatible representative system format to the representative system 210 for representative discussions with the user 202.

As illustrated in FIG. 1, the electronic display system 206 is associated with the channel that the user 202 is communication with. In this way, the electronic display system 206 may be positioned within an entity brink-and-mortar location for visualization and manipulation by the user 202.

The electronic display system 206 generally comprises a display 235, a communication device 236, a processing device 238, and a memory device 240. The display 235 is operatively coupled to the processing device 238, communication device 236, and the memory device 240. The electronic display system 206 may include a display 235 to present scannable or manipulative information about the entity and entity products for user 202 visualization while at the entity.

As further illustrated, the electronic display system 206 comprises computer-readable instructions 242 stored in the memory device 240, which in one embodiment includes the computer-readable instructions 242 of a display application 244.

In the embodiment illustrated in FIG. 1, the display application 244 allows the electronic display system 206 to be linked to the system server 208, representative system 210, and user system 204 to communicate, via a network 201, the information related to the user scanning, manipulation, or browsing on the electronic display system 206.

As illustrated in FIG. 1, the representative system 210 is connected to the user system 204, electronic display system 206, and the system server 208. The representative system 210 has the same or similar components as described above with respect to the user system 204, electronic display system 206, and the system server 208. While only one representative system 210 is illustrated in FIG. 1, it is understood that multiple representative system 210 may make up the system environment 200.

The representative system 210 is associated with a representative at the branch location the user 202 is located. The representative system 210 allows a representative to extract and review data about the user 202 and accounts associated with the user 202. Furthermore, the representative system 210 may communicate with the electronic display system 206, the system server 208, and the user system 204 via the network 201, in order to receive notifications about entity information the user 202 is viewing or manipulating via his/her user system 204.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2 illustrates a high level process flow for initiation of the three-way communication linkage 100, in accordance with one embodiment of the invention. As illustrated in block 102, the process 100 is initiated by identifying the user being within the physical location of the entity. In some embodiments, the user may be entering an entity location, such as a brink-and-mortar location associated with the entity, such as a financial institution. In this way, the system may recognize the user device via GPS, geo-fencing, ibecon, facial recognition, a predetermined registered device. In some embodiments the system may identify the user entering an entity location based on authorization of the user at a representative station, at the branch, mobile device check in, or the like. In some embodiments, the system may identify the user based on a representative keying in or accessing a user account from the representative's system. In other embodiments, the system may identify the user as being a pre-determined distance away from the branch location. This may be done via geo-fencing or geo-locating of the user via the user system being within the geo-fencing range. In other embodiments, the user may interact with the electronic display system, which may alert the system of the user being within the entity location.

Next, as illustrated in block 104, the process 100 continues by identifying the user device associated with the user and the properties of the user system. In this way, once the user is identified, the system may determine if a user device or user system is present with the user. In some embodiments, the user system may have been the means for which the user was identified above in block 102. In other embodiments, the system may identify a user system based on the means described above in block 102. In other embodiments the system may identify a user system based on identifying the user system in the entity location wireless internet area. In other embodiments, the user system may be identified based on GPS identification of the user system in the entity location. In yet other embodiments, the system may identify the user location based on user system scanning or interaction with an electronic display system at the entity location.

Once the user system is identified, the system may identify the unique identification system of the user system which may include a brand, compatible communication language, IP address, and the like in order for allowing for compatible communications with the user system. The system may also identify any communication abilities of the user system, such as a phone number, text number, or other communications abilities associated with wearable devices or the like. Furthermore, additional properties of the use system may be identified to allow for user transformation of data for compatible communication and data retrieval.

Next, as illustrated in block 106, the process 100 continues by generating a communicable linkage with the user system. In this way, the system may retrieve data on the user system associated with the entity. As such, if the user is manipulating a website associated with the entity, the system may have access to that data. The system may generate a limited retrieval system for retrieving data only related to the entity and the products and services provided by the entity. In some embodiments, the system may identify when the user interacts with the electronic display system, entity websites, entity applications, entity products/services, or the like.

As illustrated in block 108, the process 100 continues by creating a three-way linkage between the user system, representative system, and entity electronic display system. In this way, the system may be able to translate data from the entity electronic display and the representative system in order for the user system to be able receive and copulate the data. Furthermore, the system may translate data from the user system to the representative system for representative communications.

Next, as illustrated in block 110, the process 100 continues by presenting entity electronic display products and services onto the screen of the user system. In some embodiments, the system displays entity information. Entity information, as used herein may refer to products, services, promotions, or the like the entity may provide to the user. In some embodiments, the presentation may be done via overlay or integration of entity information into the user system via the user display. In this way, upon identification of products or services of the entity that the user is interested in, based on user navigation on the electronic display, historic user data associated with the entity, user discussion with the representatives, or the like.

The system presents via a display associated with the user system, an interactive application that provides additional entity information. In some embodiments, the additional entity information may be presented via an overlay on the display of the user system. The overlay, may be an overlay over the currently displayed image on the user system. The overlay may be automatically presented over the screen of the user system such that the user device may be locked during the visualization of the entity information on the screen. In this way, the system may overtake and lock portions of applications on the user system for visualization of the entity information. Furthermore, the system may convert the entity data into a compatible format for user system identification and presentation.

In some embodiments, the system may lock the user system and present the user system with the entity information during the time the user is in the entity location. In this way, the system may gain access of the user system and control the device for presentation of entity information via the display.

Once the system presents entity information onto the display of the user device, the system may allow for interactive navigation of the entity electronic display products and services on the user device, as illustrated in block 112. In this way, the system may provide an interactive and manipulatable display image on the user system. As such, the system may display entity information, including information about the products and services available from the entity related to the user.

Finally, as illustrated in block 114, the system may transmit, from the user system, back to the system and to representative systems the navigation selections of the user for the representative to be prepared for user interaction. In this way, the system may identify user navigation of display and transmit navigation via notifications to representatives. As such, upon presentation of entity information to the display of the user system, the system has access to the displaying material in order to identify the user's navigation throughout the entity information. In some embodiments, the system may identify a scanned or manipulated portion of the electronic display system. The navigation of the user device, scanned or manipulated electronic display system, and the like provide an indication to the system what services or products provided by the entity that the user is viewing. Once the information about what the user is viewing is determined by the system, the system may provide that information in a compatible representative system format to the representative system for representative discussions with the user. Furthermore, the system may generate an indication of one or more items that the user may be interest in based on the user's accounts and transactions. As such, the system may generate discussion points for the representative to bring up with the user about added services or products that the user may be interested in based on the user account information.

Alternatively, the system may store and provide the representative with historic sessions of the user, especially those sessions that were abandoned or stopped. In this way, the representative may be able to queue up the abandoned transaction and allow the user to review and re-initiate the abandoned transaction.

In some embodiments, the system may also present to the representative one or more user goals including savings or spending goals. The system may present additional products or services that may be associated with that goal in order to aid the user in reaching the goal.

FIG. 3 illustrates a process map for system communication for information retrieval and notification 300, in accordance with one embodiment of the present invention. As illustrated, the system server 208 may generate a three-way communication linkage between devices for information retrieval and notification triggering. As such, once a user system 204 is detected within a user location, the system server 208 may identify the user system 204 and extract the compatibility requirements and communication requirements of the user system 204. At that point, the system server 208 may be able to interrupt and provide the user system 204 with any display based on user history, searching, or the like associated with the entity. The electronic display system 206 may provide the system server 208 with information about what the user has searched or browsed on the interactive electronic display associated with the entity location. Furthermore the electronic display system 206 may provide the entity information to display on the user system 204. The system server 208 may translate the data received from the electronic display system 206 and present the translated data into a compatible format for user system 204 display and interaction. The interactions on the user display of the user system 204 may be tracked by the system server 208. The system server 208 may log and track the navigation of the user via the user system 204. The log may be presented in a re-configured entity compatible application to the representative system 210, for the representative to identify recently navigated products or services of the user.

FIG. 4 illustrates a process map for data transformation and compatibility conversion for information retrieval and notification 400, in accordance with one embodiment of the present invention. As illustrated in block 402, the process 400 is initiated by identifying the user system within the entity location. In some embodiments, the system may identify a user when he/she enters a location associated with the entity, such as a financial institution. In some embodiments the system may identify a user authorization at the branch or ATM. In some embodiments, the system may identify the user based on a representative or user input, such as a check in or the like. In other embodiments, the system may identify the user as being a pre-determined distance away from the branch location. This may be done via geo-fencing or geo-locating of the user, via the user system being within the geo-fencing range. In other embodiments, the user may interact with the electronic display system, which may alert the system of the interaction. In some embodiments, this interaction may be in the form of touching or manipulating the electronic display system and a recognition by the electronic display system of the user system. In some embodiments, this interaction may be a scanning or electronic interaction between the user system and the electronic display system.

Next, as illustrated in block 404, the process 400 continues by communicating with the user system to extract communication compatibilities of the user system. In this way, the system requests and/or extracts information about the user system and the communication compatibilities of the user system. The information about the user system may comprise one or more IP addresses, user system brands, compatibility requirements of the user system, and/or the like. In some embodiments, the communication compatibilities of the user system comprise the type of communications and compatibility of data for those communications of the user system. The types of communications may comprise internet, text, email, or alternative means of transmitting data to the user system. Furthermore, the data must be translated from the entity system to the compatibility file types of the user system.

Once the communication compatibilities are extracted from the user system, the process 400 continues by communicating with the electronic display system to receive data for presentation on the user system, as illustrated in block 406. In this way, the user may interact with the electronic display system and manipulate the electronic display system to navigate the display to information about products and/or services the user is interested in. As such, the system may identify the products and/or services that the user is interested. In other embodiments, the user may search for the products and/or services via his/her user device or discuss the products and/or services with an entity representative.

As illustrated in block 408, the process 400 continues by translating and manipulate the data from the electronic display system into a compatible mode for the user system. As such, once the system determines the appropriate entity information to provide to the user, the system may translate that data into a user system readable data content. The translated data may also be manipulatable by the user on the user device, such that the system may further monitor the products and/or services that the user may be interested.

Next, as illustrated in block 410, the process 400 continues by presenting the data on the user system in an interactive deployment mode. In this way, the system presents the entity information to the user via the user system in a visual format on the user system display such that the user may visualize and navigate one or more products and/or services provided by the entity tailored for the user. In some embodiments, the system may overlay a display of entity data on the user system, such that the user may visualize the entity information via the overlay. The overlay may be presented over the top of any application or home page on the user system. In some embodiments, the system may lock the user system and present the entity information such that other applications are locked from being presented during the presentation of the entity information.

Next, as illustrated in block 412, the process 400 is completed by translating the user interactions with the presented entity data into entity format for presentation to a representative system. As such, the user interaction with the entity information that was presented onto the user system may be communicated to the system, such that the system may communicate the user navigation of the entity information to a representative system for representative use during communication with the user.

FIG. 5 illustrates a process map for information retrieval and notifications 500, in accordance with one embodiment of the present invention. The process 500 is initiated by generating a three-way communication linkage as illustrated in block 502. In this way, a three-way communication linkage is generated between the user system, representative system, and the electronic display system. The three-way communication linkage is generated by the system server that allows for data transformation for compatible communication between the entity systems and the user system.

As illustrated in block 504, the process 500 continues by presenting the user with display data, specifically entity information, from the electronic display system. The user is presented this information on his/her user system. In that way, the system may take control or partial control of the user system in order to provide entity information to the user via the user system. Next, as illustrated in block 506 the system may retrieve the user selections and manipulations of the display of the user device. In this way, the system may be able to track the selections of entity information of the user that was presented on the user device.

As illustrated in block 508, the process 500 continues by communicating the navigations and selections of the user to the representative. As such, the system may determine the products and/or services that the user may be interested in, based on user navigation of entity information presented to the user on the user system, and present that navigation to the representative system for the representative to discuss the products and/or services with the user. Furthermore, the system may prompt the representative to perform preparation work based on a predicted user transaction, as such the representative may have all the documents completed and ready for user review prior to the user reaching the representative.

As illustrated in block 510, the process 500 continues by altering the user display based on representative input on products or services based on user selections and manipulations of the display. In this way, the system may alter the display of the entity information based on representative information and/or electronic display selection from the user. Once the additional altered information is provided, the system may communicate the additional user selections to the representative for follow up discussions with the user.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more general-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for three-way communication linkage generation, the system comprising:
    a memory device with computer-readable program code stored thereon;
    a communication device;
    a processing device operatively coupled to the memory device and the communication device, wherein the processing device is configured to execute the computer-readable program code to:
        identify a user entering an entity location, wherein identifying the user entering the entity location comprises identifying a user system associated with the user within the entity location and identifying compatibility protocol for the user system for communication compatibilities;
        extract navigation data from an electronic display system, wherein the electronic display system is a system within a physical location of the entity location and includes an interactive display located at and associated with the entity, wherein navigation data comprises entity information the user navigates to on the electronic display system while at the entity location;
        identify, via communication link with the electronic display system, a display configuration for entity information to be displayed on the user system, wherein the display configuration includes entity information, including products and services provided by the entity, based on the navigation data the user navigated to on the electronic display system, wherein the display configuration comprises a navigatable user interface;
        generate the three-way communication linkage via a distributed network between the user system, the electronic display system, and a representative system associated with a representative at the entity location;
        convert the display configuration for entity information received from the electronic display system into the compatibility protocol for the user system;
        present, via an overlay on the user system, the converted display configuration with entity information of user interest, wherein the entity information of user interest is based on navigation data that the user navigated to on the electronic display system at the entity location;
        translate user interaction with the converted display configuration on the user system into entity format, wherein user interaction with the converted display configuration comprises tracking the user navigation of the entity information presented via the overlay of the converted display configuration; and communicate, via a secure communication channel, the translated user interaction and user navigation of the entity information from the electronic display system and the user navigation of the entity information from the user system overlay to the representative system for representative communication with the user at the entity location.

2. The system of claim 1, further comprising identifying the user interacting and navigating the electronic display system, wherein identifying the user interacting and navigating the electronic display system comprises identifying the user system interacting with the electronic display system via scanning.

3. The system of claim 1, further comprising receiving representative input based on the representative communication with the user at the entity location and generating an altered user display with additional entity information based on the representative input.

4. The system of claim 1, wherein communicating the user navigation of the entity information from the user system overlay further comprises accessing the user system and identifying selections and navigations of the user on the user system and translating the user interactions of the entity information into an entity compatible format for presentation to the representative system.

5. The system of claim 1, wherein presenting the converted display configuration with entity information of user interest on a display associated with the user system comprises locking the functionality of the user system and altering the display of the user system with the converted display configuration with entity information, including products and services provided by the entity of user interest in the compatibility protocol for the user system.

6. The system of claim 1, wherein identifying the user entering the entity location comprises identifying a scanning or selecting of the electronic display system associated with the entity by the user device, wherein the scanning of the electronic display provides an identification of the compatibility protocol for the user system for communication compatibilities.

7. The system of claim 1, wherein identifying the user entering the entity location comprises identifying the user system associated with the user using GPS recognition or internet protocol recognition of the user system within a pre-defined geo-location associated with the entity location.

8. A computer program product for three-way communication linkage generation, the computer program product comprising at least one non-transitory computer-readable medium having computer-readable program code portions embodied therein, the computer-readable program code portions comprising:

an executable portion configured for identifying a user entering an entity location, wherein identifying the user entering the entity location comprises identifying a user system associated with the user within the entity location and identifying compatibility protocol for the user system for communication compatibilities;

an executable portion configured for extracting navigation data from an electronic display system, wherein the electronic display system is a system within a physical location of the entity location and includes an interactive display located at and associated with the entity, wherein navigation data comprises entity information the user navigates to on the electronic display system while at the entity location;

an executable portion configured for identifying, via communication link with the electronic display system, a display configuration for entity information to be displayed on the user system, wherein the display configuration includes entity information, including products and services provided by the entity, based on the navigation data the user navigated to on the electronic display system, wherein the display configuration comprises a navigatable user interface;

an executable portion configured for generating the three-way communication linkage via a distributed network between the user system, the electronic display system, and a representative system associated with a representative at the entity location;

an executable portion configured for converting the display configuration for entity information received from the electronic display system into the compatibility protocol for the user system;

an executable portion configured for presenting, via an overlay on the user system, the converted display configuration with entity information of user interest, wherein the entity information of user interest is based on navigation data that the user navigated to on the electronic display system at the entity location;

an executable portion configured for translating user interaction with the converted display configuration on the user system into entity format, wherein user interaction with the converted display configuration comprises tracking the user navigation of the entity information presented via the overlay of the converted display configuration; and an executable portion configured for communicating, via a secure communication channel, the translated user interaction and user navigation of the entity information from the electronic display system and the user navigation of the entity information from the user system overlay to the representative system for representative communication with the user at the entity location.

9. The computer program product of claim 8, further comprising an executable portion configured for identifying the user interacting and navigating the electronic display system, wherein identifying the user interacting and navigating the electronic display system comprises identifying the user system interacting with the electronic display system via scanning.

10. The computer program product of claim 8, further comprising an executable portion configured for receiving representative input based on the representative communication with the user at the entity location and generating an altered user display with additional entity information based on the representative input.

11. The computer program product of claim 8, wherein communicating the user navigation of the entity information from the user system overlay further comprises accessing the user system and identifying selections and navigations of the user on the user system and translating the user interactions of the entity information into an entity compatible format for presentation to the representative system.

12. The computer program product of claim 8, wherein presenting the converted display configuration with entity information of user interest on a display associated with the user system comprises locking the functionality of the user system and altering the display of the user system with the converted display configuration with entity information, including products and services provided by the entity of user interest in the compatibility protocol for the user system.

13. The computer program product of claim 8, wherein identifying the user entering the entity location comprises identifying a scanning or selecting of the electronic display system associated with the entity by the user device, wherein the scanning of the electronic display provides an identification of the compatibility protocol for the user system for communication compatibilities.

14. The computer program product of claim 8, wherein identifying the user entering the entity location comprises identifying the user system associated with the user using GPS recognition or internet protocol recognition of the user system within a pre-defined geo-location associated with the entity location.

15. A computer-implemented method for three-way communication linkage generation, the method comprising:
   providing a computing system comprising a computer processing device and a non-transitory computer readable medium, where the computer readable medium comprises configured computer program instruction code, such that when said instruction code is operated by said computer processing device, said computer processing device performs the following operations:
   identifying a user entering an entity location, wherein identifying the user entering the entity location comprises identifying a user system associated with the user within the entity location and identifying compatibility protocol for the user system for communication compatibilities;
   extracting navigation data from an electronic display system, wherein the electronic display system is a system within a physical location of the entity location and includes an interactive display located at and associated with the entity, wherein navigation data comprises entity information the user navigates to on the electronic display system while at the entity location;
   identifying, via communication link with the electronic display system, a display configuration for entity information to be displayed on the user system, wherein the display configuration includes entity information, including products and services provided by the entity, based on the navigation data the user navigated to on the electronic display system, wherein the display configuration comprises a navigatable user interface;
   generating the three-way communication linkage via a distributed network between the user system, the electronic display system, and a representative system associated with a representative at the entity location;
   converting the display configuration for entity information received from the electronic display system into the compatibility protocol for the user system;
   presenting, via an overlay on the user system, the converted display configuration with entity information of user interest, wherein the entity information of user interest is based on navigation data that the user navigated to on the electronic display system at the entity location;
   translating user interaction with the converted display configuration on the user system into entity format, wherein user interaction with the converted display configuration comprises tracking the user navigation of the entity information presented via the overlay of the converted display configuration; and
   communicating, via a secure communication channel, the translated user interaction and user navigation of the entity information from the electronic display system and the user navigation of the entity information from the user system overlay to the representative system for representative communication with the user at the entity location.

16. The computer-implemented method of claim 15, further comprising identifying the user interacting and navigating the electronic display system, wherein identifying the user interacting and navigating the electronic display system comprises identifying the user system interacting with the electronic display system via scanning.

17. The computer-implemented method of claim 15, further comprising receiving representative input based on the representative communication with the user at the entity location and generating an altered user display with additional entity information based on the representative input.

18. The computer-implemented method of claim 15, wherein communicating the user navigation of the entity information from the user system overlay further comprises accessing the user system and identifying selections and navigations of the user on the user system and translating the user interactions of the entity information into an entity compatible format for presentation to the representative system.

19. The computer-implemented method of claim 15, wherein presenting the converted display configuration with entity information of user interest on a display associated with the user system comprises locking the functionality of the user system and altering the display of the user system with the converted display configuration with entity information, including products and services provided by the entity of user interest in the compatibility protocol for the user system.

20. The computer-implemented method of claim 15, wherein identifying the user entering the entity location comprises identifying a scanning or selecting of the electronic display system associated with the entity by the user device, wherein the scanning of the electronic display provides an identification of the compatibility protocol for the user system for communication compatibilities.

* * * * *